(12) United States Patent
James (10) Patent No.: US 6,574,642 B1
(45) Date of Patent: Jun. 3, 2003

(54) METHODS FOR PROCESSING DATA TRANSFERRED TO SYSTEM MEMORY IN PREPARATION FOR RECORDING TO AN OPTICAL DISC

(75) Inventor: Kenneth R. James, Sunnyvale, CA (US)

(73) Assignee: Roxio, Inc., Santa Clara, CA (US)

( * ) Notice: Subject to any disclaimer, the term of this patent is extended or adjusted under 35 U.S.C. 154(b) by 0 days.

(21) Appl. No.: 09/539,481

(22) Filed: Mar. 30, 2000

(51) Int. Cl.⁷ .............................................. G06F 17/30
(52) U.S. Cl. ...................... 707/205; 360/48; 369/47.12; 369/47.22; 369/275.3
(58) Field of Search ........................ 360/48; 369/47.12, 369/47.22, 275.3; 707/205

(56) References Cited

U.S. PATENT DOCUMENTS

| | | | | |
|---|---|---|---|---|
| 5,200,943 A | * | 4/1993 | Sano et al. ............... | 369/47.22 |
| 5,563,861 A | * | 10/1996 | Kudo et al. .............. | 369/44.32 |
| 5,659,529 A | * | 8/1997 | Maeda et al. ................. | 360/48 |
| 5,663,946 A | * | 9/1997 | Ohtomo .................... | 369/275.3 |
| 5,694,381 A | * | 12/1997 | Sako ........................ | 369/47.12 |
| 5,838,666 A | * | 11/1998 | Igarashi et al. .......... | 369/275.3 |
| 6,058,091 A | | 5/2000 | Yokota et al. ................. | 369/93 |
| 6,091,686 A | | 7/2000 | Caffarelli et al. ......... | 369/53.24 |
| 6,118,737 A | | 9/2000 | Hütter ...................... | 369/30.12 |
| 6,118,754 A | | 9/2000 | Sako et al. ............... | 369/275.3 |
| 6,141,489 A | | 10/2000 | Honda .......................... | 386/95 |

* cited by examiner

Primary Examiner—Charles Rones
(74) Attorney, Agent, or Firm—Martine & Penilla, LLP (57) ABSTRACT

Methods for processing and recording data files to an optical disc media are provided. In one example, a method includes the operations of processing data files selected to be recorded and generating a file system database. The file system database generates information about the source data files, and in response to a request for a number of sectors of data, reads the requested sectors of data one at a time into a system memory buffer. The file system database writes a subheader for each of the sectors of data after each sector is written into a memory location that is before each data sector. The sectors and subheaders are then written to an optical disc media. In another example, a computer readable media is provided having program instructions for recording data on an optical disc. The program instructions generate source data information from a file system database and request a number of sectors of data from the file system database. The program instructions further include the operations of the file system reading the requested sectors one at a time into system memory buffer, writing a subheader after each sector is written into a location that is before each sector, and then recording the sectors and subheaders to an optical disc media.

28 Claims, 10 Drawing Sheets

Record Data Structure

```
File parent
Volume label index
File size
Logical block number
File time
File source path
File attributes
Data mode
On removable media
Embedded subheader
Imported
```

Figure 3B

Ordering Data Structure

```
Pointer to data file
File start offset
File end offset
```

METHODS FOR PROCESSING DATA TRANSFERRED TO SYSTEM MEMORY IN PREPARATION FOR RECORDING TO AN OPTICAL DISC

CROSS REFERENCE TO RELATED APPLICATIONS

This application is related to U.S. patent application No. 09/539,482, filed on the same day as the instant application and entitled "METHODS FOR EFFICIENT HOST PROCESSING OF DATA FILES SELECTED FOR RECORDING TO AN OPTICAL DISC MEDIA." This cross referenced application is hereby incorporated by reference.

BACKGROUND OF THE INVENTION

1. Field of the Invention

The present invention relates generally to the recording of data onto optical discs, and more particularly to a method for the efficient transfer of data from source to destination in the process of recording data to an optical media.

2. Description of the Related Art

Optical disc storage of data offers relatively high capacity data storage (e.g., approximately 640 Megabytes) on a relatively small and inexpensive optical disc. Optical disc recording commonly involves recording (sometimes referred to as "burning") audio tracks or data files on one or more spiral tracks on an optical disc, which can typically hold between 1 and 99 tracks. The high capacity of optical discs for data storage represents a tremendous advancement over prior art data storage such as the floppy disk which has a capacity of approximately 1.4 Megabytes. Conceivably, the trend will continue and optical discs will offer continually increasing storage capacities on similar sized or even smaller optical discs.

The process of burning data to an optical disc typically involves several data processing operations between the selection of data files to be recorded and the recording of those files on an optical disc. Selected data files are located, examined, and sequenced in a recording order. A database of the selected data files is generated containing the exact file locations, track numbers, file size, data mode, and other attribute information necessary for identifying and locating a data file at its source, designating and assigning files that will be sent to system cache memory in preparation for the recording operation, generating a writing order in which the data files are recorded to the destination optical media, designating destination locations, and reading the files and writing the files to the destination optical media. Once the database is generated and stored, it is processed to create lists of source data structures (e.g., file name, directory, path, root, etc.) and to send the designated files to system cache.

Once the database for the selected files has been generated, stored, and processed, portions of the database are typically sent to the CD recording engine for further processing. The prior art method unpacks a list of source data structures generated by the database and sends the source data structures through an interface to the CD recording engine where the individual structures are repacked into another list which is then sent to the track writer. The track writer, which is a component of the CD recording engine, processes the repacked list to read each file from the source or system cache and write it to a CD.

As is known, the operation of burning the selected files to a CD includes reading the source files into a system memory buffer from the source, and from system cache for those files that have been cached. Data files are read a sector at a time into the buffer. The current standard sets the sector length on a CD optical disc at 2352 bytes, and the source data written into those sectors is manipulated within the parameters of that standard. By way of example, source data (e.g., the data files selected for recording to a CD or other optical media) can be of data mode 1 or data mode 2, and data mode 2 has form 1 and form 2 variations. While data mode 1 has 2048 bytes of user data that can be written directly into a designated space in a physical sector in system memory buffer and on the destination CD, data mode 2 (both form 1 and form 2) has a subheader that must be written in the physical space before the user data. Some information in the subheader is dependent on the data in the user data portion of the sector. When the user data is read into the system memory buffer in the prior art, the track writer reads the data from the source into the system memory buffer. Because the track writer must first read the sector of data before it can determine what information will go into the subheader, the prior art track writer reads a sector of mode 2 data into the system memory buffer. Then, when the track writer is able to write the subheader, having the information from the sector just read into memory, the track writer moves the entire sector of user data one byte at a time and then writes the subheader in the space created before the user data it just moved. This process is repeated for each sector until the buffer is full. Once the buffer is full, the data is written to the destination CD or other optical media by the optical CD recording circuitry, and then the entire process is repeated until all of the selected files have been recorded.

It should be appreciated that the prior art process generates multiple lists of data records for each data file selected for burning to a CD optical disc, and utilizes considerable system resources in the processes of generating, storing, processing, and transferring the lists and structures between various devices and routines. As is known, each time the list or a variation is generated, the system dedicates and uses system resources (e.g., memory) in the evaluation of the data records and the generation of the lists. The inefficiency of the process is compounded by the fact that the processing accomplished by the database to generate the structures that are sent to the CD recording engine is then duplicated by the CD recording engine and track writer. Additionally, the reading of mode 2 data into the system memory buffer a sector at a time and then moving that data one byte at a time in order to write a subheader before the data consumes additional resources and time, and is an inefficient use of system resources.

With the ever-increasing capacity of optical discs, and the ever-increasing demand for more efficient and economical utilization of available storage capacity, the conservation of system resources and more efficient processing of data files in preparation for burning to an optical disc, as well as the recording operation, is of paramount concern. By way of example, thousands of data files could be selected for burning to a single CD optical disc with a capacity for 640 Megabytes of data. The prior art would examine each of the selected files and generate a database of those files, prepare multiple lists of information about the selected data files, with some of the lists having identical information contained therein, would unpack source structures and send them through a COM interface only to have them repacked into yet another list, and in the process of recording mode 2 data, would read entire sectors into a buffer and then move those sectors a byte at a time in order to write a subheader immediately preceding the data. Because the system resources could rapidly become overloaded, some of the data might be lost, the writing process could fail altogether, and the system performance itself could degrade or the system could even crash.

In view of the foregoing, there is a need for a method of processing data files in preparation for recording, and then in the recording of the selected files to a CD or other optical media that minimizes drain on system resources while maximizing efficient and economical use of the storage capacity of an optical disc.

SUMMARY OF THE INVENTION

Broadly speaking, the present invention fills these needs by providing methods for efficient processing data files selected for recording to an optical disc media, and for the efficient and reliable recording of data files to an optical disc media. The invention provides methods for processing of files that minimizes the generation of lists that catalog location and attribute information about each data file before writing to the optical disc media. The invention further provides for the reading of files selected for recording to an optical disc media by a file system database that has processed the files for recording. It should be appreciated that the present invention can be implemented in numerous ways, including as a process, an apparatus, a system, a device, a method, or a computer readable media. Several embodiments of the present invention are described below.

In one embodiment, a method for the processing of data files selected to be recorded on an optical disc media is disclosed. The method includes the generating of source data information from a file system database. A number of sectors of data are requested from the file system database, and the file system database reads the requested number of sectors of data into system memory locations of a system memory buffer. The file system database writes a subheader for each sector of data after writing each sector of data into a memory location that is before each sector of data. Once the requested sectors of data have been read into the system memory buffer, the sectors and subheaders are recorded to an optical disc media.

In another embodiment, a method for processing data to be recorded on an optical disc media is disclosed. The method includes the generating of source data information from a file system database. A number of sectors of data are requested from the file system database, and the file system database reads the requested number of sectors one at a time into system memory locations of a system memory buffer. The file system database reads the requested number of sectors one at a time into the system memory locations of a system memory buffer such that each sector (e.g., a first portion which is user data) is read into the system memory buffer with an offset. There is a memory location then before each sector of data that is defined by the offset. The file system database writes a subheader (e.g., a second portion) for each of the requested sectors of data after reading each sector of data. The subheader is written into the memory location defined by the offset before each sector of data. When the requested sectors of data have been read into the system memory buffer, the data and subheaders are recorded to optical disc media.

In still a further embodiment, a computer readable media having program instructions for recording data to an optical disc is disclosed. The computer readable media includes program instructions to generate source data information from a file system database, and for requesting a number of sectors of data from the file system database. The computer readable media has further program instructions to read each of the requested number of sectors one at a time into system memory locations of a system memory buffer, and to write a subheader for each of the requested sectors after each of the sectors is read into the system memory buffer. The subheader is written into a memory location that is before each sector. The computer readable media then has program instructions to record the sectors and subheaders in the system memory buffer to an optical disc media.

One benefit and advantage of the invention is more efficient processing of data files to be recorded on an optical disc media, and a more efficient and reliable recording session. By utilizing the file system database to read data directly into system memory buffer, and to offset the location into where data (e.g., user data) is read, duplication of the processing of data is minimized, and the movement of data within the system memory buffer in order to write a subheader is eliminated. The more efficient allocation and use of system resources in the processing and recording of data files to optical disc media prevents incomplete data transfer, buffer under-run, or system crash. Another benefit of the present invention is that with more efficient processing of data files, the operation proceeds faster and more reliably. This allows a user to select and record large amounts of data to record to an optical disc media and to realize the benefits of the storage capacity of optical disc media without system overload or failure.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is provided for the efficient transfer of data from source to destination in the process of recording data to an optical media. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
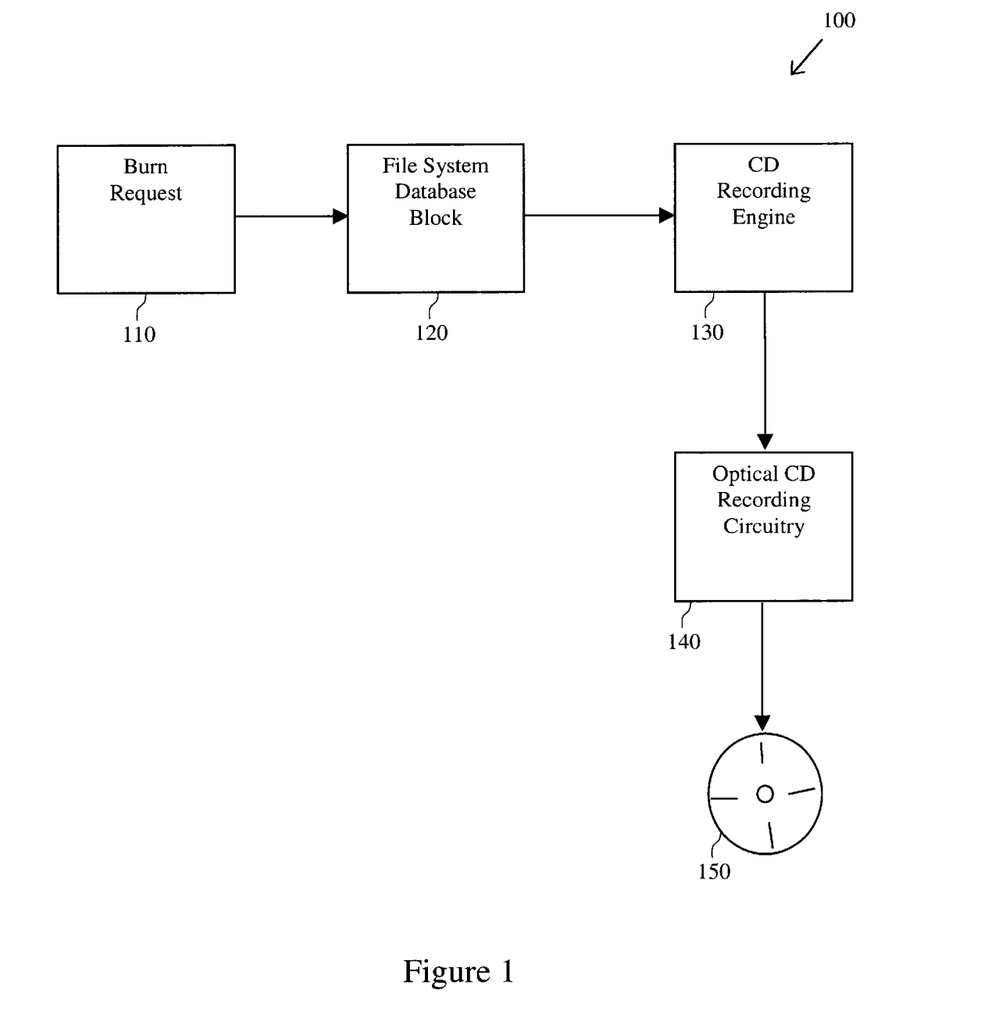
FIG. 1 illustrates a block diagram defining operations implemented in the efficient processing of data to be recorded as data files to an optical media in accordance with one embodiment of the present invention.

FIG. 1 illustrates a block diagram 100 defining operations implemented in the efficient processing of data to be recorded as data files to an optical media in accordance with one embodiment of the present invention. The burn request 110 initiates the operation by the selection of data files to be recorded. The burn request 110 can be accomplished in any number of ways including, for example, operator input into the system through a graphical user interface (e.g., dragging selected data files to a CD device icon on a computer monitor and the like), or executing a CD read/write software program and in response to a scripted set of queries, the operator selecting a group of one or more data files to be written to a CD or other optical media. The burn request 110 is the selection and identification of a group of one or more data files to be copied from their source and written to a CD or other optical media.

The file system database block 120 enables the intelligent selection of data files for recording, enables their organization for recording, and enables associated prerecording processing. In a specific example, the file system database block 120 builds a database of the files selected for recording. Each of the files is located and examined in order to generate a record data structure (see FIG. 3B) for each data file. The record data structures, as discussed in greater detail below, are records of identification, location, and attribute information about each of the files selected for recording.

In one embodiment, the files are organized into a sequence in which they will be written to the optical media. Those files that will be sent to system cache in preparation for recording are identified and assigned a specific location in system cache, each of the files is assigned a specific location in the destination optical media, and other such preparatory processing as required is accomplished by the code of the file system database block 120. Once the record data structures are generated for each file to be recorded, the record data structures are processed in the order that their associated data files will be written to the optical disc to create an ordering data structure (FIG. 4) for each data file. The ordering data structures, as discussed in greater detail below, are records of pointers to the files in their source locations, or in system cache with additional locating information to specify the exact location in system cache. For more information on record data structures and ordering data structures, reference can be made to commonly assigned U.S. Patent Application having Application No. 09/539,482, currently pending, filed on the same day, and entitled "Methods for Efficient Host Processing of Data Files Selected for Recording to an Optical Disc Media," which is herein incorporated by reference.

The CD recording engine 130 directs the recording process. In accordance with one embodiment of the invention, the track writer, through the CD recording engine 130, requests a set number of sectors of data from the file system database block 120 to fill a system memory buffer. The file system database block 120, referencing the ordering data structure, reads the data files into an offset memory space in the system memory buffer. When the buffer is full, the data is sent through the optical CD recording circuitry 140 and recorded to the CD or other optical media 150.

Figure 2:
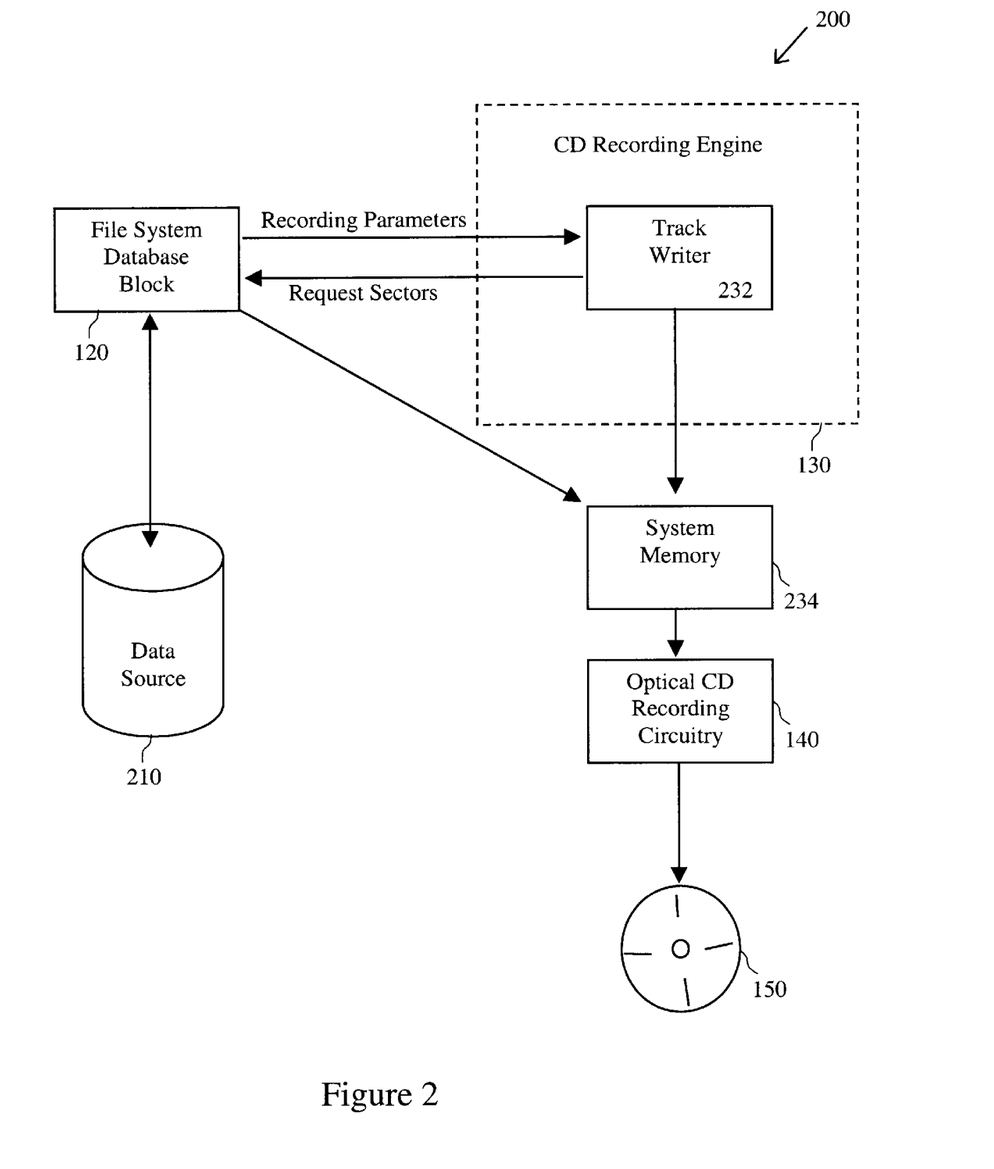
FIG. 2 is a diagram of the flow of information and data in the process of recording data files to an optical media in accordance with one embodiment of the present invention.

FIG. 2 is a diagram 200 of the flow of information and data in the process of recording data files to an optical media in accordance with one embodiment of the present invention. In the process of recording data files to an optical media, the file system database block 120 completes all of the processing of the selected data files in preparation for recording. Once the file system database block 120 has examined the selected data files and generated the recording data structures and ordering data structures, the file system database block sends the recording parameters to the track writer 232 which is a part of the CD Recording Engine 130. The track writer 232 requests a set number of sectors of data from the file system database block 120 and the file system database block 120 reads the data from the data source 210. The data is read by the file system database block 120 directly into the system memory buffer 234. When the set number of sectors has been read and the system memory buffer is full, the data is written by the optical CD recording circuitry 140 to the CD or other optical media 150.

Figure 3A:
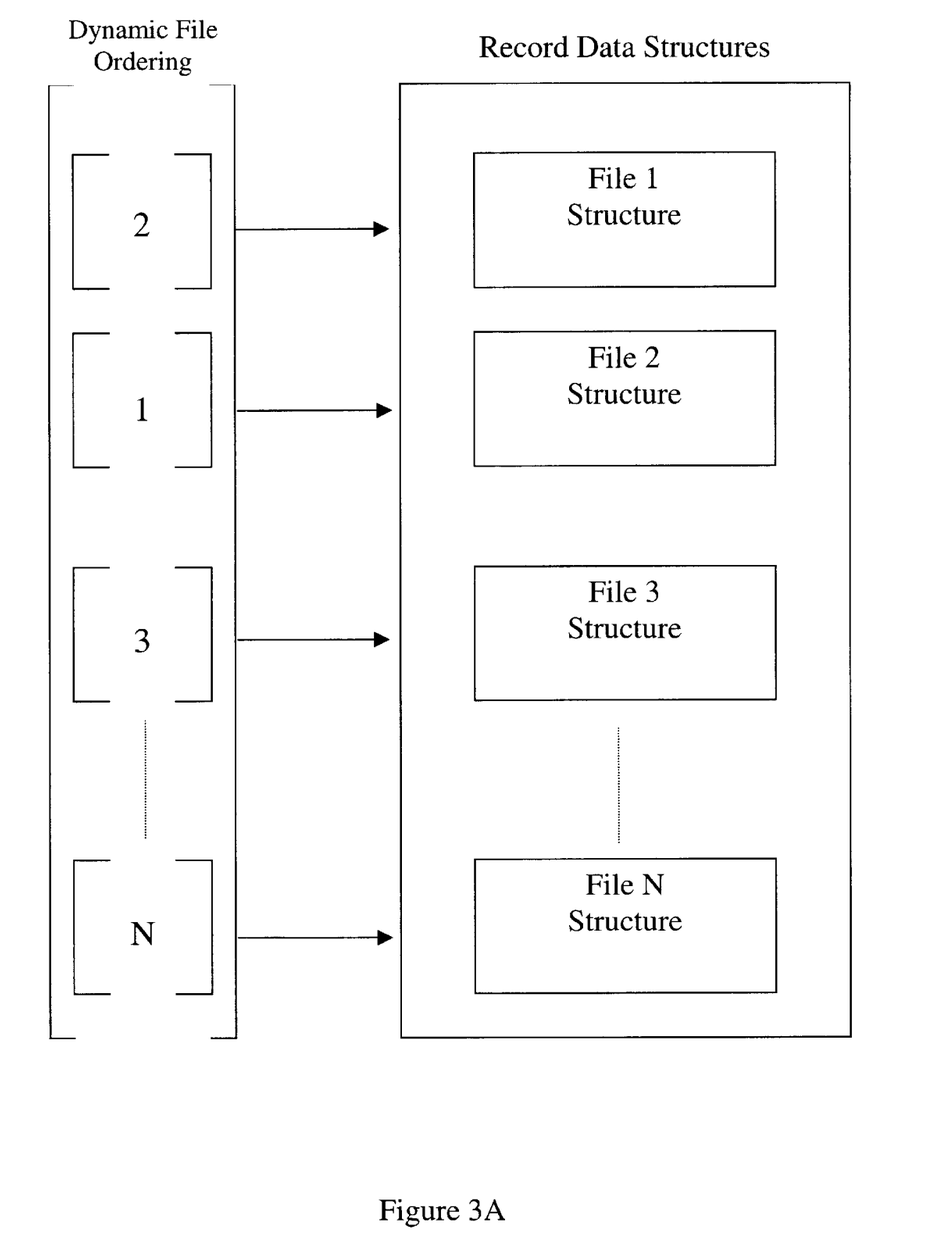
FIG. 3A illustrates the dynamic file ordering of the selected data files in accordance with one embodiment of the invention.
Figure 3B:
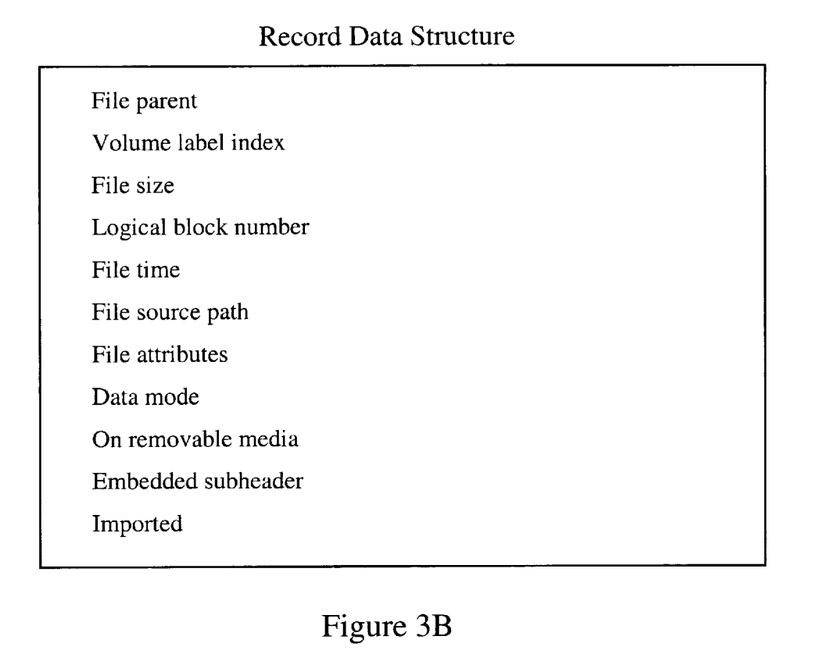
FIG. 3B is an exemplary record data structure in accordance with one embodiment of the invention.

In preparation for recording, the file system database block 120 examines each of the selected data files and creates a record data structure for each data file. FIG. 3B is an exemplary record data structure in accordance with one embodiment of the invention. As can be seen in FIG. 3B, the record data structure is a record of location, identification, and other attributes for each data file. The record data structure lists the parent directory of a file and the volume on which the file is located. The size of the file is listed, the logical block number on the destination CD or other optical media, and the date and time of the last modification of the data file. The complete path to the source file is listed, and other attributes such as whether the file is a system file or a hidden file, the data mode of the file, whether or not the file is located on removable media such as a Zip™ drive, Jaz™ drive, or the like, if the file contains embedded subheaders, and whether or not the file has ever been written to the destination CD or other optical media in another session. The record data structure is created by the file system database block 120 (FIG. 2) upon examination of the selected data files to catalog the necessary information for the processing of the files for writing to CD or other optical media. Specific information fields are discussed in greater detail below in reference to the particular data flow process with which it is associated.

In addition to creating a record data structure for each data file, the file system database block 120 creates a writing order designating the sequence in which the data files will be written to the CD or other optical media. FIG. 3A illustrates the dynamic file ordering of the selected data files in accordance with one embodiment of the invention. In FIG. 3A, pointers are used to indicate the sequence in which the data files associated with the record data structures will be recorded. As can be seen, a pointer is associated with each record data structure. The pointers indicate the writing order of the associated data files. The file system database block 120 then processes each record data structure, in the writing order to create the ordering data structures.

Figure 4:
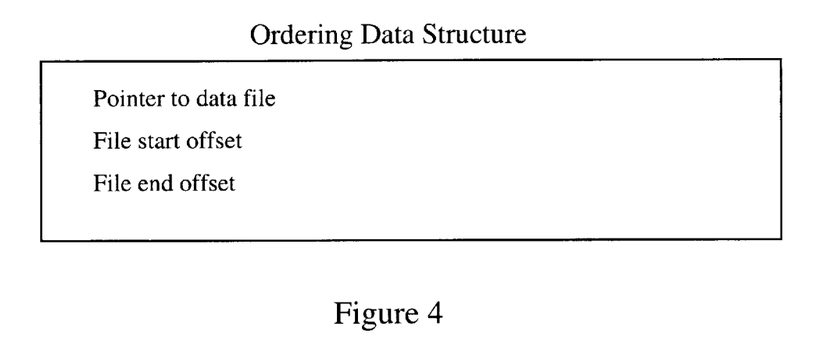
FIG. 4 shows an exemplary ordering data structure in accordance with one embodiment of the invention.

FIG. 4 shows an exemplary ordering data structure in accordance with one embodiment of the invention. The ordering data structure is a record of pointers to the source file, and the ordering data structures are compiled in the order in which the files will be written to the CD or other optical media. FIG. 4 shows a pointer and two additional fields. The pointer is to the data file at its source, unless the data file is one that has been sent to system cache. In that case, the pointer is to the system cache memory. The additional data fields are the file start offset and the file end offset. This is an address in system cache noting the beginning and end of the data file. As is known, the recording of data to CDs and other optical media requires a constant flow of data during the session. One method of ensuring the steady flow of data is by using system cache to queue large volumes of fragmented data. In one embodiment of the present invention, the file system data base block 120 generates the ordering data structure so that when the recording process begins, the file system data base block 120 follows the ordering data structure to the source files at their source or in system cache, and maintains a constant flow of data to the recording engine.

Referring again to FIG. 2, once the file system database block 120 has processed the data files selected for recording, the file system database block 120 communicates recording parameters to the track writer 232. In one embodiment of the present invention, the recording parameters include the length of the track, the data mode, and the logical sector size. The length of the track is the total number of physical sectors the selected data files will require on the media to which the files will be recorded. By way of example, it is known that the physical sector size on a CD is 2352 bytes. The length of the track is the total number of sectors, each sector having 2352 bytes, that will be required to record the selected data.

Figure 6A:
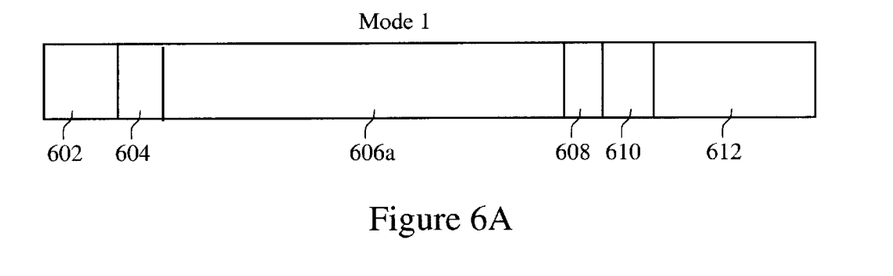
FIGS. 6A–6C illustrate CD sectors of data for each of the data mode types in accordance with one embodiment of the invention.
Figure 6B:
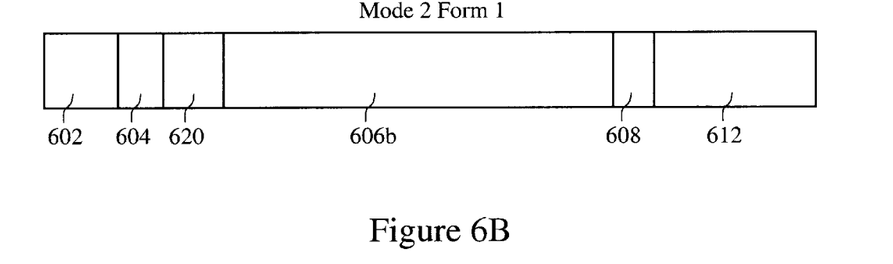
Figure 6C:
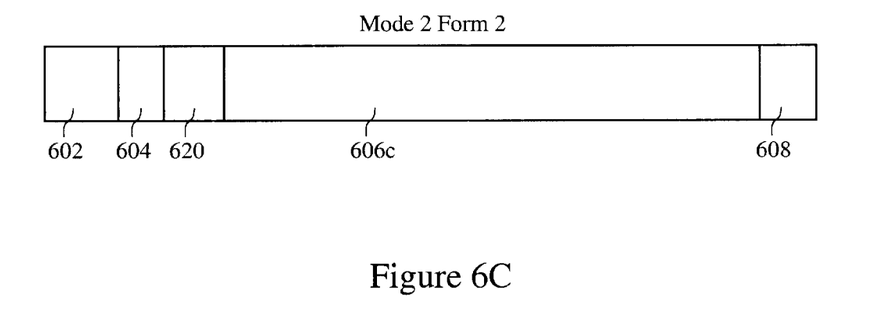

The data mode recording parameter includes mode 1 and mode 2, and mode 2 is defined as one of mode 2 form 1 and mode 2 form 2. A track is either data mode 1 or data mode 2, and a data mode 2 track can have both mode 2 form 1 and mode 2 form 2 data. FIGS. 6A–6C illustrate CD sectors of data for each of the data mode types in accordance with one embodiment of the invention. FIG. 6A shows a CD mode 1 sector of data. A CD mode 1 data sector includes 12 synchronization bytes 602, 4 bytes of header 604, 2048 user data bytes 606a, 4 bytes of error detection and correction (EDC) 608, 8 blank bytes 610, and 276 bytes of error correction code (ECC) 612. FIG. 6B shows a CD mode 2 form 1 sector of data. A CD mode 2 form 1 data sector includes 12 synchronization bytes 602, 4 bytes of header 604, 8 subheader bytes 620, 2048 bytes of user data 606b, 4 EDC bytes 608, and 276 ECC bytes 612. FIG. 6C shows a CD mode 2 form 2 sector of data. A CD mode 2 form 1 data sector includes 12 synchronization bytes 602, 4 header bytes 604, 8 subheader bytes 620, 2324 bytes of user data 606c, and 4 EDC bytes 608. The sectors defined by FIGS. 6A–6C define the format that will be on the physical disc after recording. However, only a portion of the sector is actually processed by the file system database block for writing by the track writer.

Thus, a logical sector size is that part of a sector that will be read into the memory by the file system database block so that the track writer can write the selected sectors to the optical media. The logical sector includes a first portion that is read into memory at an offset and a second portion that is read into memory at a location before the first portion, thus filling the offset in memory. As a result, in memory, the logical sector will not need to be read into memory and then shifted, or re-read into a different location, to write the second portion. In one embodiment, the first portion includes the user data (and possibly ECC if desired) and the second portion includes the subheader. All other portions of the physical sector are written to the optical disc media by the optical CD recording circuitry.

Figure 5:
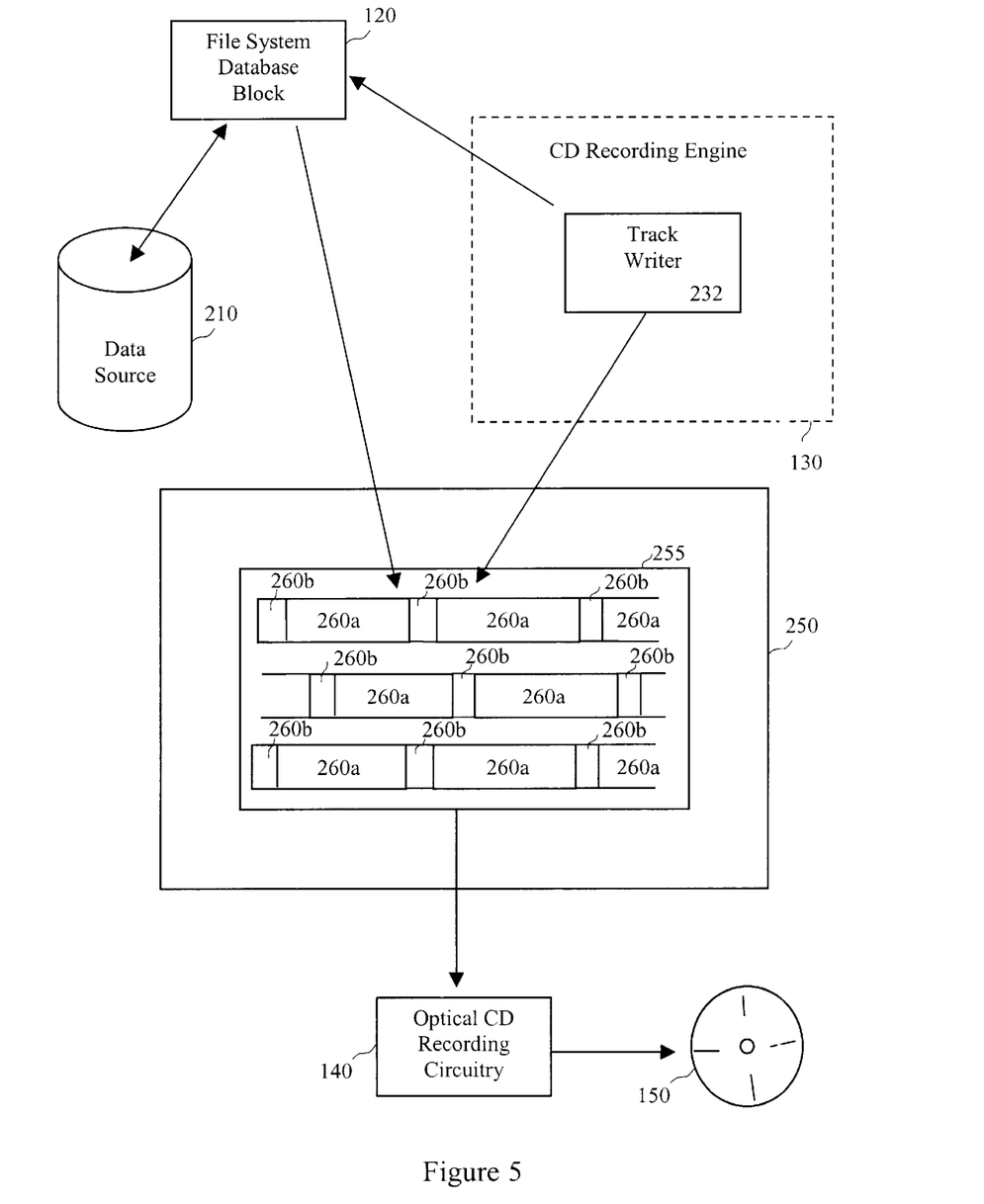
FIG. 5 illustrates a high level description of the process for reading in the first portion of a logical sector into memory at an offset location, in accordance with one embodiment of the present invention.

FIG. 5 illustrates a high level description of the process for reading in the first portion of a logical sector into memory at an offset location, in accordance with one embodiment of the present invention. Also shown is the second portion that is read into memory in the offset location. Broadly speaking, the process includes the track writer 232 requesting a set number of sectors of data from the file system database block 120 to fill a system memory buffer 255. The file system database block 120 reads the first portion of the logical sector which includes the user data from the data source 210 (or system cache) into the system memory buffer 255 in an offset location 260a. After the first portion of a logical sector is read into the offset location 260a, the file system database block 120 writes the second portion of the logical sector into the space before the first portion of the logical sector 260b. The process of reading logical sectors of data into offset locations in memory proceeds one sector at a time until the buffer 255 is full or no data remains to be recorded. When the buffer 255 is full, the optical CD recording circuitry 140 writes the data to the CD or other optical disc media 150, adding the remaining bytes to fill each physical sector on the disc.

In one embodiment, the data to be recorded on a CD is mode 2 form 1 data. The logical sector, therefore, is 2332 bytes which includes 2048 bytes of user data. As shown in FIGS. 6B and 6C, mode 2 data includes a subheader 620 before the user data 606b/606c. The subheader 620 contains identifying information about the user data to follow including the form (e.g., form 1 or form 2) and a marker identifying the last sector of a data file. The 2048 bytes of user data are read into the offset memory space as a first portion of a logical sector, and the 8 byte subheader is written as a second portion of a logical sector in the space created by the offset preceding the first portion of the logical sector. The remaining 276 bytes of EDD are added to complete the logical sector.

In another embodiment, the data to be recorded is mode 2 form 2 data. The logical sector, again, is 2332 bytes which includes 2324 bytes of user data and an 8 byte subheader. In this embodiment, the 2324 bytes of user data are read into an offset memory space as a first portion of a logical sector, and the 8 byte subheader is written as a second portion of the logical sector in the space created by the offset preceding the first portion of the logical sector. In yet another embodiment, the data to be recorded is mode 1 data. As shown in FIG. 6A, mode 1 data contains 2048 bytes of user data 606a and there is no subheader in mode 1 data. The logical sector in this embodiment is 2048 bytes. Since the logical sector size is equivalent to the amount of user data, there is no offset required and the data is read directly into the buffer memory space one sector at a time.

FIGS. 7A through 7D show a flowchart diagram 700 illustrating the method operations performed in which data is recorded on an optical disc in accordance with several embodiments of the invention. The method begins with operation 710 in which the recording parameters for the session are communicated by the file system database to the recording engine. The recording parameters are generated by the file system database after the examination of the selected data files (e.g., source data information). As described above, the track writer is a component of the recording engine. The recording parameters are therefore also communicated to the track writer. The recording engine performs processing and instruction functions, and the track writer writes the data as directed by the recording engine. The recording parameters that are sent to the recording engine include the length of the track that will be written to an optical disc, the data mode of the selected files, and the size of the logical sector. The length of the track is the number of physical sectors of data to be written. The data files selected for recording to an optical disc will fill a certain number of physical sectors on the destination CD or other optical media. That number of sectors is the is the length of the track that will be written to the optical disc. The size of the logical sector is equal to the number of bytes (or other suitable unit of measure) of user data and other information that is read into the system memory buffer. As is known, the size of a physical sector on a CD is 2352 bytes. The logical sector represents only a portion of the physical sector and is dependent on the data mode of the source files as explained in greater detail below.

As described above, the data mode is either mode 1, mode 2 form 1, or mode 2 form 2. A track will contain files of only one data mode, but a mode 2 track can contain both mode 2 form 1 and mode 2 form 2 files. The data mode determines the number of bytes of user data in a sector. Mode 1 data sectors contain 2048 bytes of user data. The remaining bytes in a physical sector of mode 1 data sector are described above in reference to FIG. 6A. The logical sector size of a mode 1 data track is 2048 bytes. The logical sector is that amount of user data and other information that is read into system memory buffer. Mode 2 form 1 data sectors also contain 2048 bytes of user data. The remaining bytes in a physical sector of mode 2 form 1 data are described above in reference to FIG. 6B. Mode 2 form 2 data sectors contain 2324 bytes of user data. The remaining bytes in a physical sector of mode 2 form 2 data are described above in reference to FIG. 6C. The logical sector size of a mode 2 data track (both form 1 and form 2), is 2332 bytes.

Figure 7A:
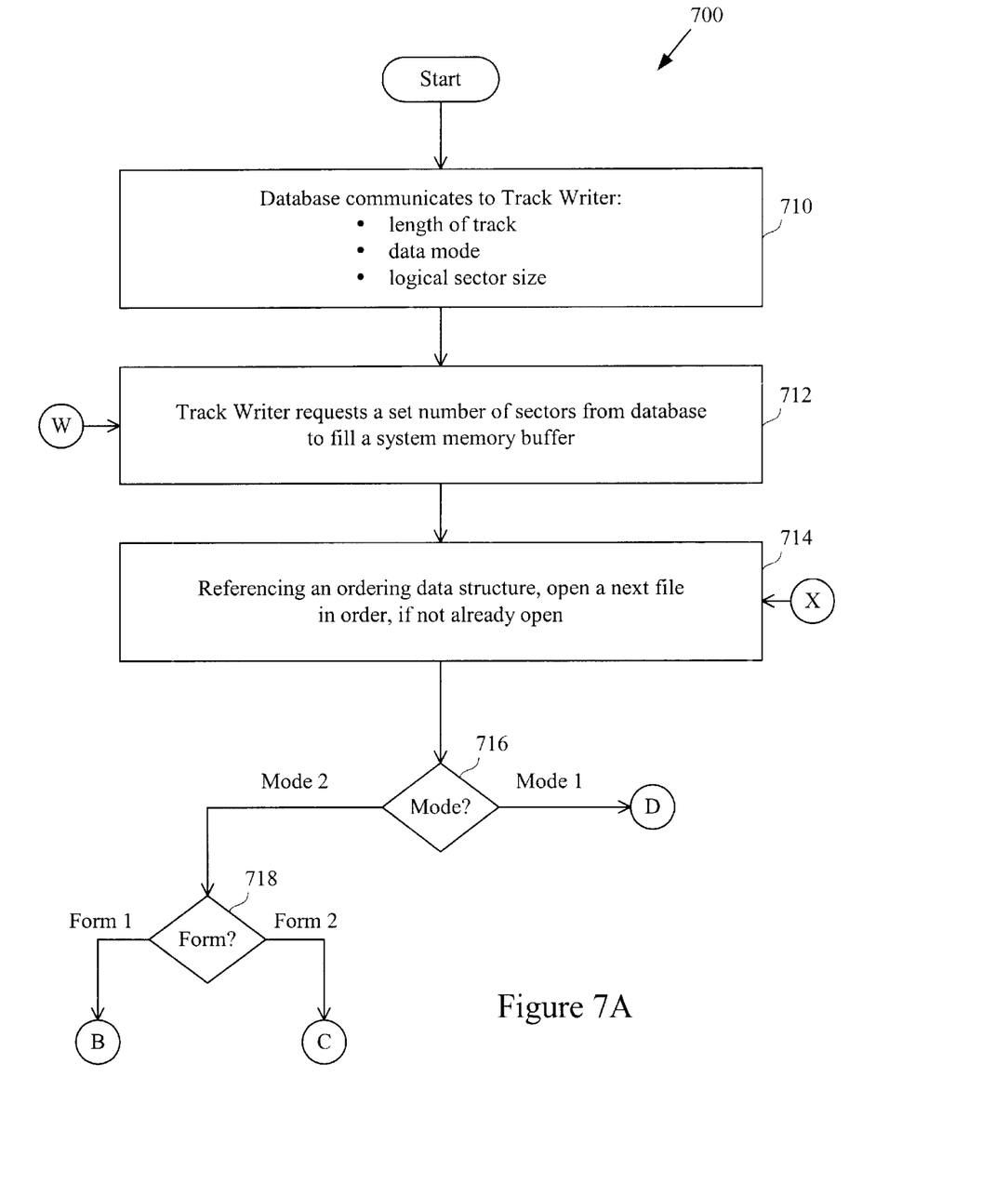
FIGS. 7A through 7D show a flowchart diagram 700 illustrating the method operations performed in which data is recorded on an optical disc in accordance with several embodiments of the invention.

Once the data recording parameters are communicated to the track writer, the method advances to operation 712 where the track writer requests a set number of sectors from the database to fill a system memory buffer. As is known, the operation of writing data to a peripheral device includes the operations of reading data from a source into system memory buffer and then writing the data from system memory buffer to the peripheral device. Unlike the prior art where multiple lists of source file information or records of pointers to source files are generated and then communicated to the recording engine so that the track writer can read the source files into buffer, the present invention uses the file system database to read the selected data from the source into the buffer. In operation 712, the track writer sends a request to the database for a set number of sectors of data. As described above, the database is the file system database that is created when a set of files is selected to be recorded to an optical disc. The processing of the data files is accomplished by the database, and in the present invention, is not duplicated by the recording engine or track writer. The track writer requests a set number of sectors of data from the database, and it is the database that will read the set number of sectors from the source or from system cache in the process of recording. In one embodiment, the set number of sectors is 27. The set number of sectors is determined by the size of the system memory buffer. In operation 712, the track writer requests that number of sectors that will fill the system memory buffer.

The method advances to operation 714 and the opening of the next data file in the order to be written to the optical media. When the track writer requests a set number of sectors from the database, the database first determines whether the next data file in the writing order is open. During the processing of the data files in preparation to write them to a CD, the file system database determines an order in which the selected data files will be written to the CD, and creates an ordering data structure. The ordering data structure, as described above in reference to FIG. 4, is the dynamic ordering of the data files by use of pointers to indicate the sequence in which the files will be written to the CD. In the case of those files that are sent to system cache in preparation for writing to the optical media, the pointer can only point to the system cache. The ordering data structure includes file start and end offset fields that identify the exact location in system cache for those files that have been cached.

In accordance with the ordering data structure, the data files are sent to the track writer in response to requests for a set number of sectors of data, a sector at a time, and read into system memory buffer. In some cases, the database will open a file and begin to send sectors of data, but not all of the sectors of the data file will be sent in response to a single request (e.g., the set number of sectors requested is less than the total number of sectors in the file). The remaining sectors of the file, or another portion, is sent in response to the next request for data sectors. Therefore, in operation 714, the database first checks to see if the next file in the writing order is already open before opening the next file in sequence.

The method operations performed in which data is recorded on an optical disc is dependent upon the mode and form of the data to be recorded. In decision block 716, the flowchart diagram 700 bifurcates into two embodiments of the invention. If the data files to be recorded are mode 2, the method proceeds to a decision block 718, and a further bifurcation into two embodiments of mode 2 data based on whether the data files are mode 2 form 1 or mode 2 form 2. Thus, if the data is mode 2 form 1, the method proceeds to B in FIG. 7B. If the data is mode 2 form 2, the method proceeds to C in FIG. 7C, and if the data is mode 1, the method proceeds to D in FIG. 7D.

Figure 7B:
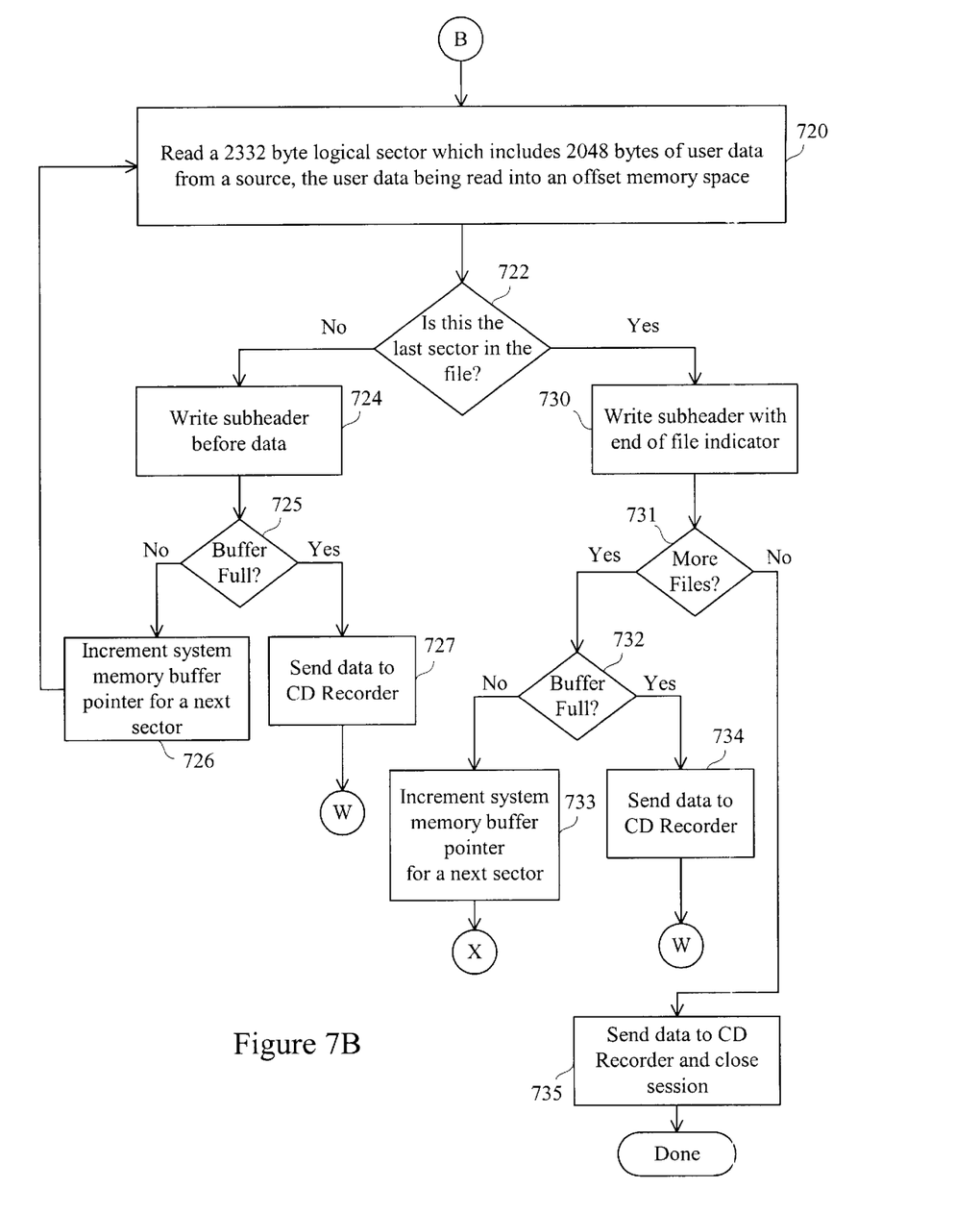

FIG. 7B shows the continuing flowchart diagram 700 illustrating the method operations performed in which data is recorded on an optical disc in accordance with one embodiment of the present invention. FIG. 7B illustrates an embodiment in which the data to be recorded to an optical disc is Mode 2 form 1. As illustrated, the method continues to operation 720 in which the file system, in response to the request from the track writer (operation 712, FIG. 7A), reads a 2332 byte logical sector which includes 2048 bytes of user data from a source (or from system cache) into a offset memory space. The database reads 2048 bytes of user data from the source or from system cache into the 2332 byte logical sector in system memory buffer. As described above and illustrated in FIG. 6B, mode 2 form 1 data contains 2048 bytes of user data. When mode 2 form 1 data is written to a CD, an 8 byte subheader is written before the user data that, among other things, identifies the form of the data, as well as whether or not the sector that follows is the last sector in the data file. Because it cannot be determined whether the data is the last sector in the data file until the sector is read into the memory space, the subheader cannot be written until after the data is read into the memory space. Therefore, in operation 720, the 2048 bytes of mode 2 form 1 data (user data) are read into an offset location of the 2332 byte logical sector to allow for a subheader to be written after the data has been read into the offset memory space, and in one embodiment, the offset is 8 bytes to allow for an 8 byte subheader. This offset can of course be larger or smaller depending on the implementation.

The method then advances to decision block 722 in which the determination is made whether the data that was just read into the offset memory space is the last sector in the data file currently being read into memory. If it is the last sector of the file, the method proceeds to operation 730 which is discussed in detail below. If it is not the last sector of the data file, the method proceeds to operation 724 and writes the subheader for the sector into the offset space before the 2048 bytes of user data. As discussed above, the subheader identifies the last sector of a data file, and so if the sector is not the last of a file, an end of file marker would not be written in the subheader.

The method next makes a determination in decision block 725 whether or not the buffer is full. In operation 712 (FIG. 7A), the track writer requested a set number of sectors to fill a system memory buffer. The sectors are read into the system memory buffer a sector at a time, and after each sector is read, the system checks if any buffer memory space remains. If there is remaining space in the buffer (e.g., the buffer is not full), the system increments a pointer to the next sector in the system memory buffer. The method advances to operation 726 if the buffer is not full, and increments the system memory buffer pointer for the next sector. The pointer simply indicates the next sector of the buffer into which data is to be written. As each sector is written, and as long as more sectors remain in the buffer, the pointer increments to the next sector.

If the buffer is not full, the method increments the pointer in operation 726, then loops back to operation 720 and reads the next 2332 byte logical sector with 2048 bytes of user data being read into an offset memory space. If the buffer is full (decision block 725), the method proceeds to operation 727 and sends the data in the system memory buffer to the CD recorder. When the data is sent to the CD Recorder, there is once again a set number of sectors available in the system memory buffer and the method loops back to operation 712 (FIG. 7A) and the track writer requesting another set number of sectors from the database to fill the system memory buffer. This is designated on FIG. 7B as the connector "W" that follows operation 726. On FIG. 7A, "W" inputs to operation 712, signifying the loop as described above.

If the response to decision block 722 in FIG. 7B is that the data read into an offset memory space in operation 720 is the last sector in the file, the method proceeds to operation 730 and writes the subheader in the offset space before the data, and includes in the subheader an end of file indicator. After the subheader is written, the method advances to decision block 731 to determine whether there are more files to be written in the session. If there are more files to be written, the method advances to decision block 732 to do a buffer check as discussed above in reference to decision block 725. If the buffer is not full in decision block 732, the method proceeds to operation 733 and increments the system memory buffer pointer to the next sector. The method then loops back to operation 714 (FIG. 7A) and opens the next file in order. Since the response to decision block 722 had been that the previous sector was the last sector in the file, when the method loops back to operation 714, the next file in order will not already be open. In FIG. 7B, the loop back to operation 714 is through the connector "X" following operation 733, and in FIG. 7A, "X" is shown as an input to operation 714 to represent the loop.

If the buffer is full at decision block 732, the method proceeds to send the data in the system memory buffer to the CD recorder in operation 734, and then loops back to operation 712 and the track writer requests another set number of sectors from the database to fill the system memory buffer. Just as in operation 727 above, the loop back to operation 712 following operation 734 is through the connector "W" following operation 734.

Returning to decision block 731, if there are no more files in the session, the method advances to operation 735 and sends the data in the system memory buffer to the CD recorder. Because there are no remaining files to record in the session, the method then closes the session, and the method is done.

Figure 7C:
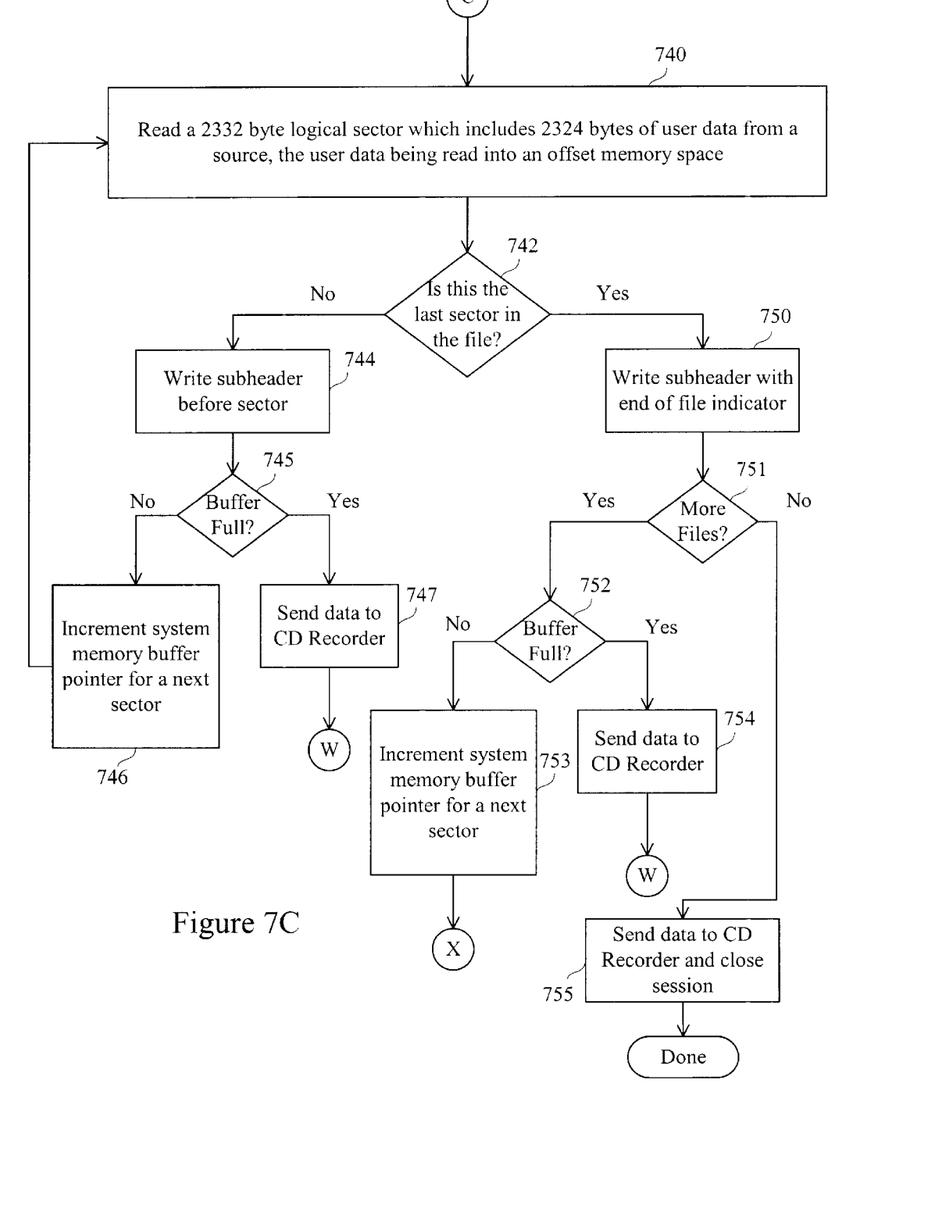

FIG. 7C shows the continuing flowchart diagram 700 illustrating the method operations performed in which data is recorded on an optical disc in accordance with another embodiment of the present invention. FIG. 7C illustrates an embodiment in which the data to be recorded to an optical disc is mode 2 form 2. As illustrated, the method continues to operation 740 in which the file system, in response to the request from the track writer (operation 712, FIG. 7A), reads a 2332 byte logical sector which includes 2324 bytes of user data from a source (or from system cache), the user data being read into an offset memory space. The database reads 2324 bytes of user data from the source or from system cache into the 2332 byte logical sector in system memory buffer. As described above and illustrated in FIG. 6C, mode 2 form 2 data contains 2324 bytes of user data. When mode 2 form 2 data is written to a CD, an 8 byte subheader is written before the user data that, among other things, identifies the form of the data, as well as whether or not the sector that follows is the last sector in the data file. Because it cannot be determined whether the data is the last sector in the data file until the data is read into the memory space, the subheader cannot be written until after the data is read into the memory space. Therefore, in operation 740, the 2324 bytes of user data are read into an offset location of the 2332 byte logical sector to allow for a subheader to be written after the data has been read into the offset memory space, and in one embodiment, the offset is 8 bytes to allow for an 8 byte subheader.

The method then advances to decision block 742. It should be appreciated that, from this point forward on FIG. 7C, the method is essentially identical to mode 2 form 1 data as illustrated in FIG. 7B. For purposes of the method operations illustrated, the primary difference between mode 2 form 1 data and mode 2 form 2 data is that mode 2 form 2 data has 2324 bytes of user data in a sector, and mode 2 form 1 data has 2048 bytes of user data in a sector. In decision block 742, the determination is made whether the data that was just read into the offset memory space is the last sector in the data file currently being read into memory. If it is the last sector of the file, the method proceeds to operation 750 which is discussed in detail below. If it is not the last sector of the data file, the method proceeds to operation 744 and writes the subheader for the sector into the offset space before the 2324 bytes of user data. As discussed above, the subheader identifies the last sector of a data file, and so if the sector is not the last of a file, an end of file marker would not be written in the subheader.

The method next makes a determination in decision block 745 whether or not the buffer is full. If there is remaining space in the buffer (e.g., the buffer is not full), the system increments a pointer to the next sector in the system memory buffer. The method advances to operation 746 if the buffer is not full, and increments the system memory buffer pointer for the next sector. The pointer simply indicates the next sector of the buffer into which data is to be written. As each sector is written, and as long as more sectors remain in the buffer, the pointer increments to the next sector.

If the buffer is not full, the method increments the pointer in operation 746, then loops back to operation 740 and reads the next 2332 byte logical sector with 2324 bytes of user data being read into an offset memory space. If the buffer is full (decision block 745), the method proceeds to operation 747 and sends the data in the system memory buffer to the CD recorder. When the data is sent to the CD Recorder, there is once again a set number of sectors available in the system memory buffer and the method loops back to operation 712 (FIG. 7A) and the track writer requests another set number of sectors from the data base to fill the system memory buffer. This is designated on FIG. 7C as the connector "W" that follows operation 726. On FIG. 7A, "W" inputs to operation 712, signifying the loop as described above.

If the response to decision block 742 in FIG. 7C is that the data read into an offset memory space in operation 740 is the last sector in the file, the method proceeds to operation 750 and writes the subheader in the offset space before the data, and includes in the subheader an end of file indicator. After the subheader is written, the method advances to decision block 751 to determine whether there are more files to be written in the session. If there are more files to be written, the method advances to decision block 752 to do a buffer check as discussed above in reference to decision block 745. If the buffer is not full in decision block 752, the method proceeds to operation 753 and increments the system memory buffer pointer to the next sector. The method then loops back to operation 714 (FIG. 7A) and opens the next file in order. Since the response to decision block 742 had been that the previous sector was the last sector in the file, when the method loops back to operation 714, the next file in order will not already be open. In FIG. 7C, the loop back to operation 714 is through the connector "X" following operation 753, and in FIG. 7A, "X" is shown as an input to operation 714 to represent the loop.

If the buffer is full at decision block 752, the method proceeds to send the data in the system memory buffer to the CD recorder in operation 754, and then loops back to operation 712 and the track writer requests another set number of sectors from the database to fill the system memory buffer. Just as in operation 747 above, the loop back to operation 712 following operation 754 is through the connector "W" following operation 754.

Returning to decision block 751, if there are no more files in the session, the method advances to operation 735 and sends the data in the system memory buffer to the CD recorder. Because there are no remaining files to record in the session, the method then closes the session, and the method is done.

Figure 7D:
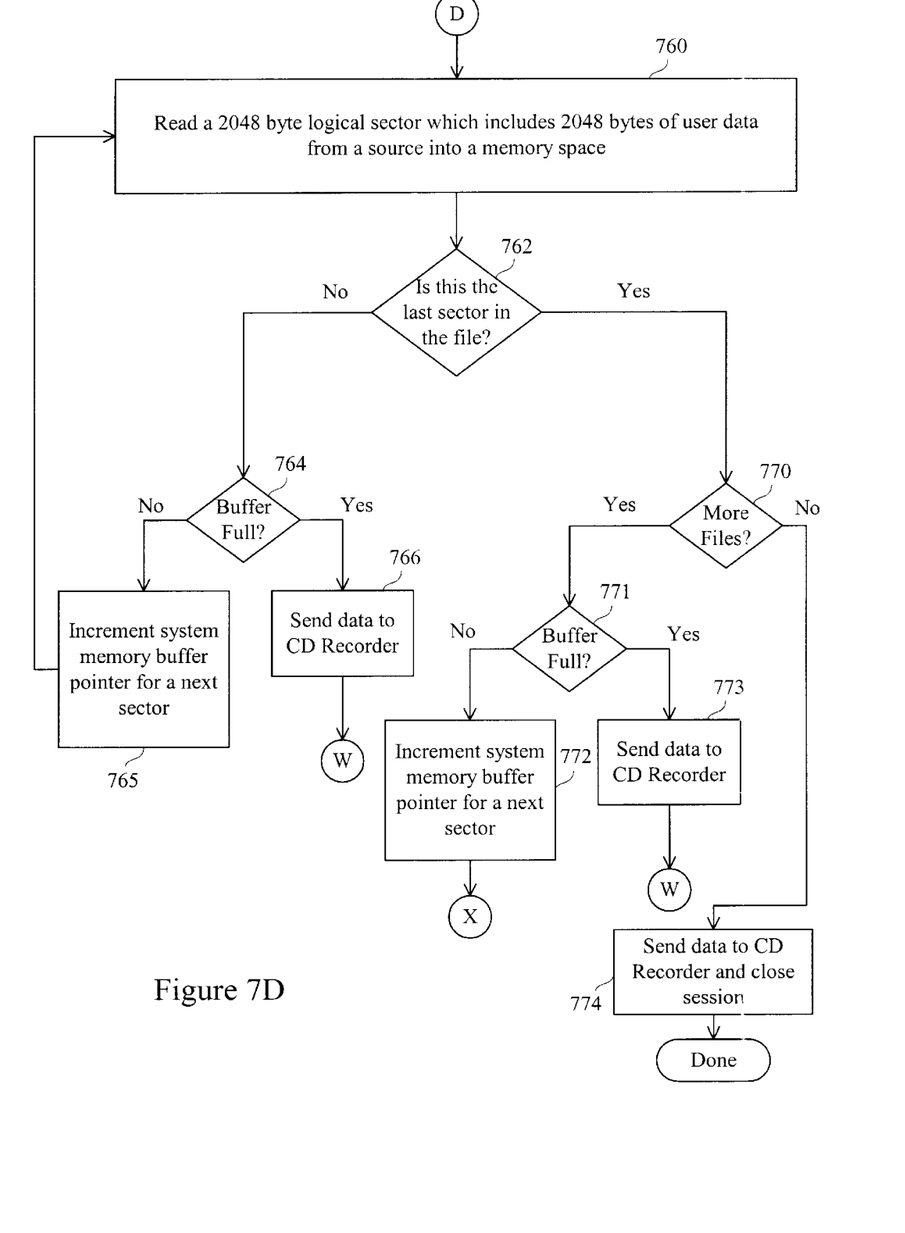

FIG. 7D shows the continuing flowchart diagram 700 illustrating the method operations performed in which data is recorded on an optical disc in accordance with one embodiment of the present invention. FIG. 7D illustrates an embodiment in which the data to be recorded to an optical disc is mode 1. As shown, the method continues to operation 760 in which the file system, in response to the request from the track writer (operation 712, FIG. 7A), reads a 2048 byte logical sector which is all user data from a source (or from system cache) into a memory space. In this embodiment, the logical sector is the same size as the number of bytes of user data. As described above and illustrated in FIG. 6A, mode 1 data contains 2048 bytes of user data. Unlike mode 2 data, there is no subheader associated with mode 1 data, and there is no requirement to read into an offset memory space so that a subheader can be written after the data sector is read. Therefore, the 2048 bytes of user data in operation 760 are read into a memory space.

The method then advances to decision block 762 where the method determines whether the data is the last sector in the file. If it is not the last sector in the file, the method advances to decision block 764 and a buffer check as in the method operations described above. If the buffer is not full, the method advances to operation 765 and increments the system memory buffer pointer for the next sector. The method then loops back to operation 760 and reads another 2048 byte logical sector into a memory space. If, in operation 764, the buffer is full, the method advances to operation 766 and sends the data in the system memory buffer to the CD Recorder. The method then loops back to operation 712 (FIG. 7A) through connector "W" and the track writer requests another set number of sectors from the database to fill the system memory buffer.

In decision block 762, if the response is that the sector is the last sector in the file, the method advances to decision block 770 to determine whether there are more files to write in the session. If there are more files, the method does a buffer check in decision block 771. If the buffer is not full, the method proceeds to operation 772 and increments the system memory buffer pointer for the next sector and then loops back to operation 714 in FIG. 7A where the database, referencing an ordering data structure, opens the next file in order. Since the previous sector was the last sector in a file, the next file in order will not already be open. The embodiment of the method illustrated in FIG. 7D loops back to operation 714 as above through connector "X". If, in decision block 771, the buffer is full, the method proceeds to operation 773 and sends the data in the system memory buffer to the CD recorder, and then proceeds through connector "W" to operation 712 in FIG. 7A where the track writer requests another set number of sectors from the database to fill the system memory buffer.

If the response to decision block 770 is that there are no more files, then the method advances to operation 774 where the data in the system memory buffer is sent to the CD recorder, the session is closed, and the method is done.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

The exemplary embodiments described herein are for purposes of illustration and are not intended to be limiting. Accordingly, those skilled in the art will recognize that the present embodiments are to be considered as illustrative and not restrictive, and the invention is not to be limited to the details given herein, but may be modified within the scope and equivalents of the appended claims.

What is claimed is:

1. A method for processing data to be recorded on an optical disc, comprising:

generating source data information from a file system database;

requesting a number of sectors of data from the file system database;

reading each of the number of sectors one at a time to system memory locations of a system memory buffer, the number of sectors being read by the file system database from one of a source and a system cache memory;

writing a subheader for each of the number of sectors, each of the subheaders being written after each of the number of sectors is written, and each of the subheaders being written in a memory location that is before each sector; and recording the number of sectors and subheaders in the system memory buffer to the optical disc.

2. A method for processing data to be recorded on an optical disc as described in claim 1, wherein the source data information generated from the file system database is communicated to a track writer, the source data information including a length of a track, a data mode, and a logical sector size.

3. A method for processing data to be recorded on an optical disc as described in claim 2, wherein the length of the track is determined by a total amount of data to be recorded, and the logical sector size is determined by the data mode.

4. A method for processing data to be recorded on an optical disc as described in claim 2, wherein the data mode includes one of a mode 1 and mode 2.

5. A method for processing data to be recorded on an optical disc as described in claim 4 wherein the mode 2 includes one of form 1 and form 2.

6. A method for processing data to be recorded on an optical disc as described in claim 5, wherein the logical sector size of mode 2 form 1 and mode 2 form 2 is 2332 bytes.

7. A method for processing data to be recorded on an optical disc as described in claim 4, wherein the logical sector size of mode 1 is 2048 bytes.

8. A method for processing data to be recorded on an optical disc as described in claim 1, further comprising:

opening of source data files by the file system database in an order in which the source data files will be recorded on the optical disc.

9. A method for processing data to be recorded on an optical disc as described in claim 1 wherein the reading of each of the number of sectors is such that each sector is read into the system memory locations with an offset.

10. A method for processing data to be recorded on an optical disc as described in claim 9 wherein the memory location that is before each sector is defined by the offset.

11. A method for processing data to be recorded on an optical disc, comprising:

generating source data information from a file system database;

requesting a number of sectors of data from the file system database;

reading each of the number of sectors one at a time to system memory locations of a system memory buffer, the number of sectors being read by the file system database from one of a source location and a system cache memory;

reading each of the number of sectors one at a time to the system memory locations of the system memory buffer such that each sectors read into the system memory locations with an offset and wherein there is a memory location before each sector that is defined by the offset;

writing a subheader or each of the number of sectors, each of the subheaders being written after each of the number of sectors is written, and each of the subheaders being written in the memory location that is before each sector; and recording the number of sectors and subheaders in the system memory buffer to the optical disc.

12. A method for processing data to be recorded on an optical disc as described in claim 11, wherein the source data information generated from the file system database is communicated to a track writer, the source data information including a length of a track, a data mode, and a logical sector size.

13. A method for processing data to be recorded on an optical disc as described in claim 12, wherein the length of the track is determined by a total amount of data to be recorded, and the sector size is determined by the data mode.

14. A method for processing data to be recorded on an optical disc as described in claim 12, wherein the data mode includes one of a mode 1 and a mode 2.

15. A method for processing data to be recorded on an optical disc as described in claim 14 wherein the mode 2 includes one of form 1 and form 2.

16. A method for processing data to be recorded on an optical disc as described in claim 15, wherein the logical sector size of mode 2 form 1 and mode 2 form 2 is 2332 bytes.

17. A method for processing data to be recorded on an optical disc as described in claim 14, wherein: the logical sector size of mode 1 is 2048 bytes.

18. A method for processing data to be recorded on an optical disc as described in claim 11, further comprising:

opening of source data files by the file system database in an order in which the source data files will be recorded on the optical disc.

19. A computer readable media having program instructions for recording data on an optical disc, comprising:

program instructions for generating source data information from a file system database;

program instructions for requesting a number of sectors of data from the file system database;

program instructions for reading each of the number of sectors one at a time to system memory locations of a system memory buffer, the number of sectors being read by the file system database from one of a source location and a system cache memory;

program instructions for writing a subheader for each of the number of sectors, each of the subheaders being written after each of the number of sectors is written, and each of the subheaders being written in a memory location that is before each sector; and program instructions for recording the number of sectors and subheaders in the system memory buffer to the optical disc.

20. A computer readable media having program instructions for recording data on an optical disc as described in claim 19, wherein the source data information generated from the file system database is communicated to a track writer, the source data information including a length of a track, a data mode, and a logical sector size.

21. A computer readable media having program instructions for recording data on an optical disc as described in claim 20, wherein the length of the track is determined by a total amount of data to be recorded, and the logical sector size is determined by the data mode.

22. A computer readable media having program instructions for recording data on an optical disc as described in claim 20, wherein the data mode includes one of a mode 1 and a mode 2.

23. A computer readable media having program instructions for recording data on an optical disc as described in claim 22 wherein the mode 2 includes one of form 1 and form 2.

24. A computer readable media having program instructions for recording data on an optical disc described in claim 23, wherein the logical sector size of mode 2 form 1 and mode 2 form 2 is 2332 bytes.

25. A computer readable media having program instructions for recording data on an optical disc as described in claim 22, wherein: the logical sector size of mode 1 is 2048 bytes.

26. A computer readable media having program instructions for recording data on an optical disc described in claim 19, further comprising:

opening of source data files by the file system database in an order if, which the source data files will be recorded on the optical disc.

27. A computer readable media having program instructions for recording data on an optical disc described in claim 19 wherein the reading of each of the number of sectors is such that each sector is read into the system memory locations with an offset.

28. A computer readable media having program instructions for recording data on an optical disc described in claim 27 wherein the memory location that is before each sector is defined by the offset.

* * * * *